(12) United States Patent
Dai et al.

(10) Patent No.: US 8,928,734 B2
(45) Date of Patent: Jan. 6, 2015

(54) METHOD AND SYSTEM FOR FREE-VIEW RELIGHTING OF DYNAMIC SCENE BASED ON PHOTOMETRIC STEREO

(75) Inventors: Qionghai Dai, Beijing (CN); Guannan Li, Beijing (CN)

(73) Assignee: Tsinghua University (CN)

( * ) Notice: Subject to any disclaimer, the term of this patent is extended or adjusted under 35 U.S.C. 154(b) by 614 days.

(21) Appl. No.: 13/113,178

(22) Filed: May 23, 2011

(65) Prior Publication Data

US 2011/0285822 A1    Nov. 24, 2011

(30) Foreign Application Priority Data

May 21, 2010  (CN) .......................... 2010 1 0188306

(51) Int. Cl.
| | | |
|---|---|---|
| *H04N 13/02* | (2006.01) | |
| *G06T 17/00* | (2006.01) | |
| *G06T 15/60* | (2006.01) | |
| *G06K 9/00* | (2006.01) | |
| *G06K 9/36* | (2006.01) | |
| *G06T 7/00* | (2006.01) | |

(52) U.S. Cl.
CPC ........... *G06T 7/0073* (2013.01); *G06T 2200/04* (2013.01); *G06T 2207/10021* (2013.01); *G06T 2207/10152* (2013.01); *G06T 2207/30241* (2013.01)

USPC ............ 348/46; 345/420; 345/426; 382/154; 382/276

(58) Field of Classification Search
USPC .............. 345/420, 426; 348/46; 382/154, 276
See application file for complete search history.

(56) References Cited

U.S. PATENT DOCUMENTS

| | | | |
|---|---|---|---|
| 2004/0150641 A1* | 8/2004 | Duiker .......................... | 345/426 |
| 2006/0182367 A1* | 8/2006 | Moghaddam ................. | 382/276 |
| 2009/0052767 A1* | 2/2009 | Bhalerao et al. ............. | 382/154 |
| 2009/0322745 A1* | 12/2009 | Zhang et al. .................. | 345/420 |

* cited by examiner

*Primary Examiner* — Joseph Ustaris
*Assistant Examiner* — Farhan Mahmud
(74) *Attorney, Agent, or Firm* — Cantor Colburn LLP

(57) ABSTRACT

A method and a related system of free-view relighting for a dynamic scene based on photometric stereo, the method including the steps of: 1) performing multi-view dynamic videos of an object using a multi-view camera array under a predetermined controllable varying illumination; 2) obtaining a three-dimensional shape model and surface reflectance peculiarities of the object; 3) obtaining a static relighted three-dimensional model of the object and a three-dimensional trajectory of the object; 4) obtaining a dynamic relighted three-dimensional model; and 5) performing a free-view dependent rendering to the dynamic relighted three-dimensional model of the object.

11 Claims, 6 Drawing Sheets

METHOD AND SYSTEM FOR FREE-VIEW RELIGHTING OF DYNAMIC SCENE BASED ON PHOTOMETRIC STEREO

CROSS-REFERENCE TO RELATED APPLICATIONS

The present application claims priority to, and benefits of Chinese Patent Application No. 201010188306.6 filed on May 21, 2010 with the State Intellectual Property Office, P.R.C., the entirety of which is hereby incorporated by reference.

TECHNICAL FIELD

The present disclosure relates to digital image processing, more particularly to a method and a system for free-view relighting of a dynamic scene based on photometric stereo which may relight an object with a free-view by capturing dynamic videos under controllable varying illuminations using a multi-view camera array and recovering normal and reflectance peculiarities of the object.

BACKGROUND

The statements in this section merely provide background information related to the present disclosure and may or may not constitute prior art.

With rapid development of digital acquisition and processing, the dynamic video becomes one of the most popular media formats in daily life and scientific research. During video processing and playing, video quality and effect are heavily influenced by illumination. In addition, different photographing view points also lead to different appearance. As a result, to achieve observation of an object from a free view point and to generate different effects under varying lighting conditions, free viewpoint relighting needs to be performed for the object based on dynamic videos.

Presently, object relighting methods mainly comprise object relighting based on parametric illumination model and object relighting based on image.

In the relighting method based on photometric stereo, the object is captured under a plurality of controllable lighting conditions or lightings, and combined with a parametric illumination model, geometric property and reflectance peculiarities on the object surface may be recovered so that the object may be performed with relighting under a new lighting condition based on the illumination model, and the object is rendered according to a free view to be displayed. However, because scenes are collected under a plurality of controllable lightings in this method and the geometric information of the object surface is recovered based on an infinite-distance camera model during computing, the relighting method based on photometric stereo is used mainly for single view static scenes. And presently, even few relighting methods are available for dynamic scenes whereas expensive high speed cameras are needed. And because a parametric illumination model, such as a Lambertian lighting model or a spherical harmonics model, has to be resolved, the relighting method of a dynamic scene is normally limited to the processing of a Lambertian surface.

On the contrary, in the relighting method based on images, the collected object images under a plurality of dense controllable lightings are used as basis vectors, and the relighting of the object is achieved by the linear combination of the basis vectors. Because the collected images are combined as the basis vectors without resolving parameters in the resolution illumination model during the process, authenticity of the relighting effects is superior. However, the method has to be performed by sampling the object images under very dense lightings, the sampling cost and complexity thereof are high. And due to the absence of three-dimensional geometric information, free-view rendering can hardly be achieved.

BRIEF SUMMARY

In viewing thereof, the present disclosure is directed to solve at least one of the problems existing in the art.

An object of the present disclosure is to provide a method for free-view relighting of a dynamic scene based on photometric stereo, which may achieve free-view relighting of the dynamic scene with reduced technical complexities. Further, another object of the present disclosure is to provide a system for free-view relighting of a dynamic scene based on photometric stereo, which may realize free-view relighting of the dynamic scene easily.

According to an aspect of the disclosure, a method of free-view relighting for a dynamic scene based on photometric stereo may be provided. The method may comprise steps of: (1) performing multi-view dynamic videos capturing of an object using a multi-view camera array under a predetermined controllable varying illumination; (2) obtaining a three-dimensional shape model and surface reflectance peculiarities of the object based on the captured multi-view dynamic videos; (3) obtaining a static relighted three-dimensional model of the object based on the obtained three-dimensional shape model and surface reflectance peculiarities thereof, and obtaining a three-dimensional trajectory of the object based on the three-dimensional shape model, the surface reflectance peculiarities and the multi-view dynamic videos; (4) obtaining a dynamic relighted three-dimensional model based on the static relighted three-dimensional model and the three-dimensional trajectory of the object; and (5) performing a free-view dependent rendering to the dynamic relighted three-dimensional model of the object, whereby a free-view relighting of the object is achieved.

According to an embodiment of the disclosure, the step (1) may further comprise a step of: setting a controllable lighting sequence by a controllable light source array comprising a plurality of LED light sources to provide the desired predetermined controllable varying illumination.

According to an embodiment of the disclosure, the step (1) further comprises the following steps of: performing geometric and color calibration for the multi-view camera array; and performing synchronizing calibration between the multi-view camera array and the controllable light source array, so that the multi-view capturing may be performed for the dynamic scene.

According to an embodiment of the disclosure, the step (1) further comprises the following steps of: placing a crystal ball at a center of the capturing scene surrounded by the multi-view camera array and the controllable light source array, and photographing the crystal ball by the multi-view camera array using the predetermined controllable lighting sequence provided by the controllable light source array; and forming a panorama of the dynamic scene based on frames of the crystal ball in the multi-view dynamic video to obtain a illumination environment map corresponding to the time.

According to an embodiment of the disclosure, the step (2) further comprises the following steps of: obtaining surface normal information and surface reflectance peculiarities of a visible area in each single view using the obtained dynamic videos of the object for the each single view; and integrating the surface normal information and the surface reflectance peculiarities of the visible area in each view to obtain the three-dimensional shape model of the object and a model surface reflectance peculiarities corresponding to the three-dimensional shape model.

According to an embodiment of the disclosure, the step of obtaining the normal information and the surface reflectance peculiarities further comprises the following steps of: aligning any two image frames captured under uniform lighting of the controllable lighting sequence in the obtained dynamic videos for each single view and obtaining a two-dimensional trajectory of the object; interpolating the obtained two-dimensional trajectory of the object and aligning each image frame captured video under variable lighting of the controllable lighting sequence with the image frame captured under the uniform lighting; performing a confidence screening pixels in the image frames captured under the variable lighting and the uniform lighting using Robust Principal Component Analysis method; and recovering the surface normal information and the surface reflectance peculiarities in the visible areas of the object in the each single view using the image frames acquired under the predetermined controllable varying illumination after the confidence verification based on a polynomial texture model.

According to an embodiment of the disclosure, the step of recovering the surface normal information and the surface reflectance peculiarities in the visible areas of the object in the each single view further comprises the following steps of: recovering the surface normal information N and a diffuse albedo coefficient $\rho^d$ in the visible areas of the object in the single view based on a Lambertian lighting model $I^d = \rho^d (N*L)$, where L is calculated based on the environment maps; recovering the specularity $(\rho_1^s, \ldots, \rho_K^s)$ of the surfaces in the corresponding visible areas based on $I^s = I - I^d$ and the polynomial texture model, where $\rho_1^s, \rho_K^s$ are specularity albedo coefficients corresponding to the first to $k^{th}$ order, and I represents a pixel value in the captured image frame; and obtaining reflectance peculiarities $\rho = (\rho^d, \rho_1^s, \ldots, \rho_K^s)$ of the surfaces in the visible areas by combining the diffuse albedo coefficient $\rho^d$ and the specularity $(\rho_1^s, \ldots, \rho_K^s)$.

According to an embodiment of the disclosure, the polynomial texture model is as follows:

$$I^s = \|L\| \sum_{k=1}^{K} \rho_k^s (N*H)^k,$$

and $H = \frac{1}{2}(V+L)$, where K represents an order of the polynomial texture model; L represents an incident light direction; V represents a viewing direction; and H represents a halfway vector based on L and V respectively.

According to an embodiment of the disclosure, the step of integrating the surface normal information and the surface reflectance peculiarities of the visible area in each view to obtain a three-dimensional shape model of the object and model surface reflectance peculiarities corresponding to the three-dimensional shape model further comprises a step of adding local smoothness constraints to the surface normal information and the surface reflectance peculiarities of the object in each sub-divided area of the visible areas which are divided into a plurality of sub-divided areas.

According to an embodiment of the disclosure, the step of integrating the surface normal information and the surface reflectance peculiarities of the visible area in each view to obtain a three-dimensional shape model of the object and model surface reflectance peculiarities corresponding thereto further comprises the following steps of: matching the surface normal information and the surface reflectance peculiarities of the visible areas in the object in adjacent views using a matching error energy function and removing erroneous matching points by epipolar constrain; and integrating the surface normal information and the surface reflectance peculiarities of the visible areas in each single view of the object based on the matching results of the adjacent views to calculate the three-dimensional shape model of the object and the surface reflectance peculiarities corresponding to each model vertex of the model.

According to an embodiment of the disclosure, the step of integrating the surface normal information and the surface reflectance peculiarities of the visible area in each view to obtain a three-dimensional shape model of the object and model surface reflectance peculiarities corresponding thereto may further comprise a step of filling the surface normal information and the surface reflectance peculiarities of holes existing on the surface of the object and the invisible areas based on smoothness constraints to obtain the three-dimensional shape model with complete and continuous surface normal information and the surface reflectance peculiarities.

According to an embodiment of the disclosure, the step (3) may further comprise the steps of: obtaining the three-dimensional trajectory of each model vertex of the three-dimensional shape model by the least square method based on the three-dimensional shape model; and obtaining the surface reflectance peculiarity of each model vertex constrained by the two-dimensional trajectory in combination with parameters of the camera array.

According to an embodiment of the disclosure, the step of obtaining the three-dimensional trajectory of each point on the surface of the three-dimensional shape model may further comprise a step of performing inpainting and filtering to the surface of the obtained three-dimensional shape model according to scene smoothness constraints to the three-dimensional trajectory of each model vertex of the object.

According to another aspect of the disclosure, a system for free-view relighting of a dynamic scene based on photometric stereo may be provided. The system may comprise: a controllable light source array for generating predetermined controllable varying illuminations; a multi-view camera array for capturing dynamic videos of an object under the predetermined controllable varying illuminations; and a relighting device for obtaining a three-dimensional shape model and surface reflectance peculiarities of the three-dimensional shape model of the object based on the captured dynamic videos of the object, obtaining a static relighted three-dimensional model based on the three-dimensional shape model and surface reflectance peculiarities of the object, obtaining a three-dimensional trajectory of the object based on the obtained three-dimensional shape model, surface reflectance peculiarities thereof and the multi-view dynamic videos, obtaining a dynamic relighted three-dimensional model based on the static relighted three-dimensional model and the three-dimensional trajectory of the object, and performing a free-view dependent rendering on the dynamic relighted three-dimensional model of the object, whereby the free-view relighting of the object is achieved.

According to an embodiment of the disclosure, the multi-view camera array is synchronized with the controllable light source array setting a controllable lighting sequence, to provide the desired predetermined controllable varying illumination.

According to an embodiment of the disclosure, the relighting device may comprise an environment map acquiring module for forming a panorama by frames of a crystal ball based on multi-view videos captured on the crystal ball placed at a center of a sampling scene surrounded by the multi-view camera array and the controllable light source array using the controllable lighting sequence to obtain the illumination environment map corresponding to the time.

According to an embodiment of the disclosure, the relighting device may comprise a first calculating module for obtaining a three-dimensional shape model and surface reflectance peculiarities of the three-dimensional shape model of the object based on the captured dynamic videos of the object by the multi-view camera array, obtaining a static relighted three-dimensional model based on the three-dimensional shape model and surface reflectance peculiarities of the object and obtaining a three-dimensional trajectory of the object based on the obtained three-dimensional shape model, surface reflectance peculiarities thereof and the multi-view dynamic videos; a second calculating module for obtaining a dynamic relighted three-dimensional model based on the static relighted three-dimensional model and the three-dimensional trajectory of the object from the first calculating module; and a free-view rendering module for performing the free-view dependent rendering on the dynamic relighted three-dimensional model of the object from the second calculating module based on a predetermined free-view to realize the free-view relighting of the object.

According to an embodiment of the disclosure, the first calculating module may comprise a single-view processing sub-module for obtaining surface normal information and surface reflectance peculiarities of a visible area in each single view using the obtained dynamic video for each single view; and an integrating sub-module for integrating the surface normal information and surface reflectance peculiarities of the visible area in each single view of the object to obtain the three-dimensional shape model and the model surface reflectance peculiarities of the object.

According to an embodiment of the disclosure, the single-view sub-module may be configured to: align any two image frames captured under uniform lighting of the controllable lighting sequence in the obtained dynamic videos for each single view and obtaining a two-dimensional trajectory of the object; interpolate the obtained two-dimensional trajectory of the object and align each image frame captured under variable lighting of the controllable lighting sequence with the image frame captured under the uniform lighting; perform a confidence verification to pixels in the image frames captured under the varying illuminations using Robust Principal Component Analysis method; and recover the surface normal information and the surface reflectance peculiarities in the visible areas of the object in the each single view using the image frames acquired under the predetermined controllable varying illuminations after the confidence verification based on a polynomial texture model.

According to an embodiment of the disclosure, the single-view sub-module may be configured to recover the surface normal information N and a diffuse albedo coefficient $\rho^d$ in the visible areas of the single view based on a Lambertian lighting model $I^d=\rho^d(N*L)$, where L is calculated based on the illumination environment map; recover the specularity $(\rho_1^s, \ldots, \rho_K^s)$ of the surfaces in the corresponding visible areas based on $I^s=I-I^d$ and the polynomial texture model, where $\rho_1^s, \rho_K^s$ are specularity coefficients corresponding to the first to $k^{th}$ order, and I represents a pixel value in the captured image frame; and obtain reflectance specularity $\rho=(\rho^d, \rho_1^s, \ldots, \rho_K^s)$ of the surfaces in the visible areas by combining the diffuse albedo coefficient $\rho^d$ and the specularity $(\rho_1^s, \ldots, \rho_K^s)$.

According to an embodiment of the disclosure, the polynomial texture model may be:

$$I^s = \|L\| \sum_{k=1}^{K} \rho_k^s (N*H)^k,$$

and $H=\frac{1}{2}(V+L)$, where K represents an order of the polynomial texture model; L represents an incident light direction; V represents a viewing direction; and H represents a halfway vector based on the L and V respectively.

According to an embodiment of the disclosure, the integrating sub-module may be configured to match the surface normal information and the surface reflectance peculiarities of the visible area of the object in adjacent views using a matching error energy function and remove erroneous matching points by epipolar constrain; and integrate the surface normal information and the surface reflectance peculiarities of the visible area of the object in each single view of the object based on the matching results of the adjacent views to calculate the three-dimensional shape model of the object and the surface reflectance peculiarities corresponding to each model vertex of the model.

According to an embodiment of the disclosure, the integrating sub-module may be further configured to fill the surface normal information and the surface reflectance peculiarities of holes existing on the surface of the object and the invisible areas based on smoothness constraints to obtain the three-dimensional shape model with complete and continuous surface normal information and the surface reflectance peculiarities.

According to an embodiment of the disclosure, the second calculating module may be configured to obtain the three-dimensional trajectory of each point on the surface of the three-dimensional shape model by the least square method based on the three-dimensional shape model and the surface reflectance peculiarity of each point on the surface constrained by the two-dimensional trajectory in combination with parameters of the camera array; and perform inpainting and filtering to the surface of the obtained three-dimensional shape model according to scene smoothness constraints to the three-dimensional trajectory of each model vertex of the object.

Based on the method and system for relighting of the dynamic scene, the free-view relighting of the object may be realized easily with reduced complexities.

Further, plausible rendering effects may be obtained by recovering the surface normal information and surface reflectance peculiarities of visible areas in each single view based on the polynomial texture model.

Additional aspects and advantages of the embodiments of present disclosure will be given in part in the following descriptions, become apparent in part from the following descriptions, or be learned from the practice of the embodiments present disclosure.

BRIEF DESCRIPTION OF THE DRAWINGS

These and other aspects and advantages of the disclosure will become apparent and more readily appreciated from the following descriptions taken in conjunction with the drawings in which:

FIG. 4 is a schematic view for dynamic video alignment according to an embodiment of the present disclosure, in which

DETAILED DESCRIPTION

Figure 1:
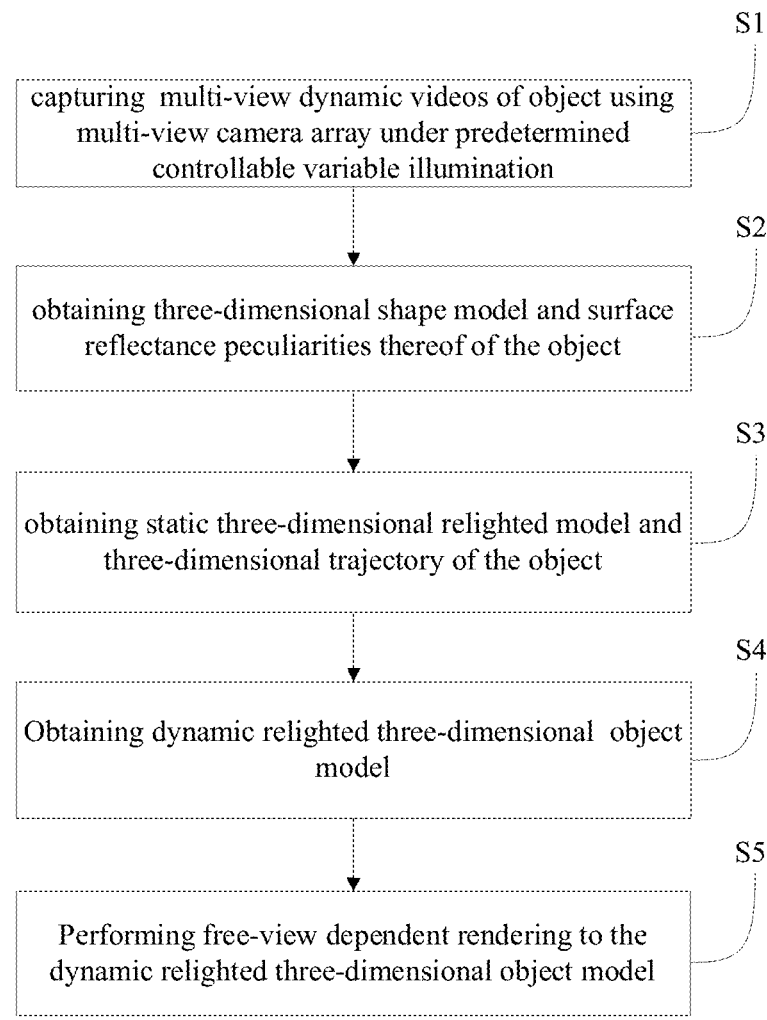
FIG. 1 is a schematic flow chart of a method for free-view relighting of a dynamic scene based on photometric stereo according to an embodiment of the disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The inventive concept of the present disclosure lies in the fact that the photometric stereo calculation is performed by using dynamic scene videos captured from multi-view under controllable varying illuminations in combination with confidence judgment, to restore the geometric information and surface reflectance peculiarity information of the captured dynamic scene. Then a three-dimensional trajectory integrated with the multi-view is combined with the scene geometric information and surface reflectance peculiarity information to implement a free-view dynamic relighting of the object. In the following, the present disclosure will be described in detail in connection with the accompanying figures.

Figure 2A:
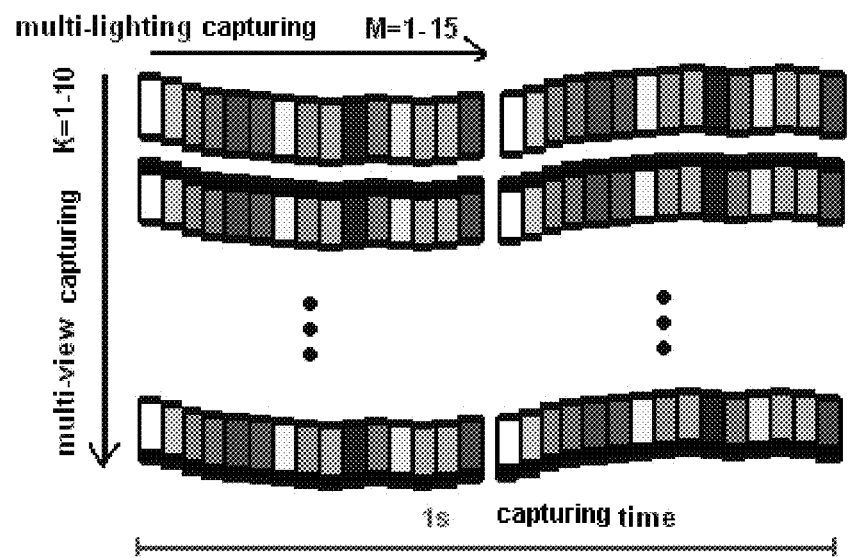
FIG. 2a is an illustration of dynamic videos capturing under controllable varying illuminations according to an embodiment of the disclosure.
Figure 2B:
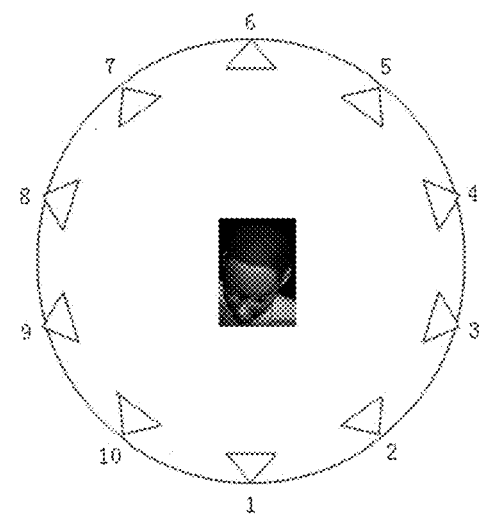
FIG. 2b is an illustration of a multi-view camera array for dynamic video capturing according to an embodiment of the disclosure.
Figure 3:
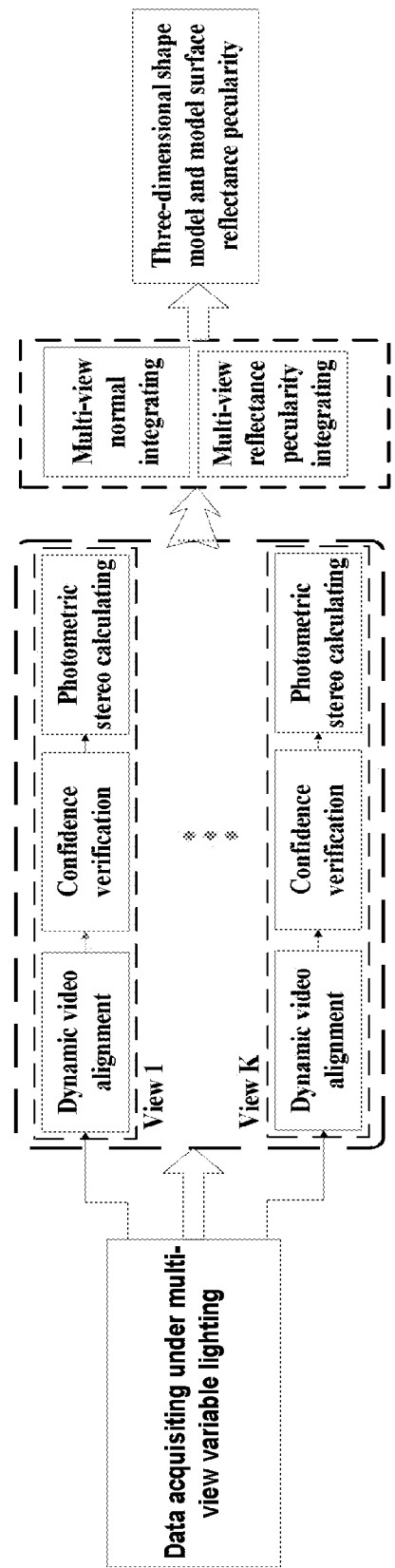
FIG. 3 is a flow chart for obtaining a three-dimensional shape model and surface reflectance peculiarities of three-dimensional shape model of an object according to an embodiment of the present disclosure.

FIG. 1 is a schematic flow chart of a method of free-view relighting for a dynamic scene based on photometric stereo according to an embodiment of the disclosure. FIG. 2a is an illustration of dynamic videos capturing under controllable varying illuminations according to an embodiment of the disclosure. FIG. 2b is an illustration of a multi-view camera array for dynamic video capturing according to an embodiment of the disclosure. FIG. 3 is a flow chart for obtaining a three-dimensional shape model of an object and the surface reflectance peculiarities of the object according to an embodiment of the present disclosure.

According to an embodiment of the disclosure, a photometric stereo-based method for free-view relighting of a dynamic scene may be provided as shown in FIG. 1. The method may comprise the following steps: (1) capturing multi-view dynamic videos of an object using a multi-view camera array under predetermined controllable varying illuminations (S1); (2) obtaining the three-dimensional shape model and surface reflectance peculiarities of the object based on the captured multi-view dynamic videos (S2); (3) obtaining a static relighted three-dimensional model of the object based on the three-dimensional shape model recovered geometry and surface reflectance peculiarities thereof, and obtaining a three-dimensional trajectory of the object based on the three-dimensional shape model, the surface reflectance peculiarities and the multi-view dynamic videos (S3); (4) obtaining a dynamic relighted three-dimensional model based on the static relighted three-dimensional model and the three-dimensional trajectory of the object (S4); and (5) performing a free-view dependent rendering to the dynamic relighted three-dimensional model of the object, whereby the free-view relighting of the object is achieved (S5). In the following, each step mentioned above will be described in detail in combination with the accompanying drawings.

For step (1) or S1, a multi-view camera array is used for capturing dynamic videos of the object under controllable varying illuminations. A controllable light source array comprising a plurality of LED light sources may be used to provide the desired predetermined controllable varying illuminations, which include uniform lighting(s) and variable (directional) lightings. For example, according to an embodiment of the disclosure, 15 kinds of controllable varying illuminations ($L_1, L_2, \ldots L_M$, M=15) may be generated using 30 LED light sources. Specifically, in the controllable varying illuminations, the light source intensity may coordinate with the camera shutter to ensure appropriate exposure effects of the captured dynamic scene. In addition, the lighting changing rate of the controllable varying illuminations may coordinate with the movement of the dynamic scene. If the moving speed of the dynamic scene is rather slow, the time interval between two uniform patterns of the lighting sequences may be longer. If a dynamic scene with a relatively rapid speed is captured, more uniform lighting patterns should be arranged among the lighting sequences to ensure the accuracy of the movement tracking and the following moving trajectory calculation. FIG. 2a is an illustration of dynamic videos capturing under controllable varying illuminations according to an embodiment of the disclosure, which will be described in detail in the following. It should be noted that FIG. 2a is described for illustration purpose rather than for limitation. It may be understood by a person skilled in the art that more uniform lighting patterns may be incorporated in FIG. 2a, which may also be fallen into the scope of the present disclosure.

And according to an embodiment of the present disclosure, ten cameras may be used to constitute the multi-view camera array so that dynamic videos of the object may be captured using the multi-view camera array under the controllable varying illuminations, as shown in FIGS. 2a and 2b. It should be noted that the total number of the LED light sources, the controllable varying illuminations and the cameras may be increased or decreased in light of actual application(s), and the variation thereof shall be understood to be fallen within scope of the disclosure. According to the present disclosure, for the dynamic scene, normally, it is not necessary to capture each movement state under fifteen different lightings. Each movement state of the object action may be captured with corresponding single lighting pattern at the present time, thus enhancing the capturing efficiency accordingly.

According to an embodiment of the present disclosure, if a high-speed camera is used for photographing, more image frames may be collected under the same time period. And according to some other embodiments of the present disclosure, the total lighting patterns used may be further increased so that denser image acquisition may be implemented. That is to say, the controllable varying illuminations and the camera array may be combined to ensure high resolution sampling of the dynamic scene in the illumination space.

According to an embodiment of the disclosure, the step S1 may further comprise a step 1.1 of performing geometric and color calibration for the multi-view camera array; and performing synchronizing calibration between the multi-view camera array and the controllable light source array, so that the multi-view information acquisiting is performed for the dynamic scene. According to this step 1.1, the image frames may be ensured to be collected under stable lightings.

According to an embodiment of the disclosure, the step S1 may further comprise a step 1.2 of placing a crystal ball at the center of the acquisiting system surrounded by the multi-view camera array and the controllable light source array as shown in FIG. 2b, and photographing the crystal ball using the multi-view camera array under a complete lighting sequence, for example 15 kinds of varying illuminations as described above, provided by the controllable light source array. Because the crystal ball has homogeneous reflectance, the environment map the acquisition system may be obtained precisely, which may provide well relighting effects of the models proposed in the present disclosure.

According to an embodiment of the disclosure, the step S1 may further comprise a step 1.3 of forming a panorama of the dynamic scene based on the obtained image frames of the crystal ball in the captured dynamic videos from multi-views, such as 10 views, to obtain environment maps corresponding to each state of the 15 kinds of controllable varying illuminations in the step 1.2.

According to an embodiment of the disclosure, the step S1 may further comprise a step 1.4 of capturing dynamic videos of the object from multi-views using the multi-view camera array by placing the object in the acquisiting system.

In the step (2) or S2, a three-dimensional shape model and surface reflectance peculiarities of the three-dimensional shape model of the object may be obtained based on the captured dynamic videos of the object, as shown in FIG. 3. The step S2 may further comprise a step 2.1 of obtaining the surface normal field and reflectance of visible areas in each single view using the captured dynamic videos, as shown in the middle portion of FIG. 3; and a step 2.2 of integrating the surface normal and reflectance information of the visible area in each single view, as shown in the right portion of FIG. 3, to obtain the three-dimensional shape model and surface reflectance peculiarities of the object.

According to an embodiment of the disclosure, the step 2.1 may further comprise a step 2.1.1 of aligning any two image frames captured under uniform lighting or lighting pattern in the obtained dynamic videos and obtaining or estimating a two-dimensional trajectory of the object for each single view. For example, two frames captured under uniform lighting patterns $L_1$ and $L_{16}$, which is the first state of the lighting sequence, may be aligned, and other frames among the lighting sequence may be aligned in a similar way.

Figure 4A:
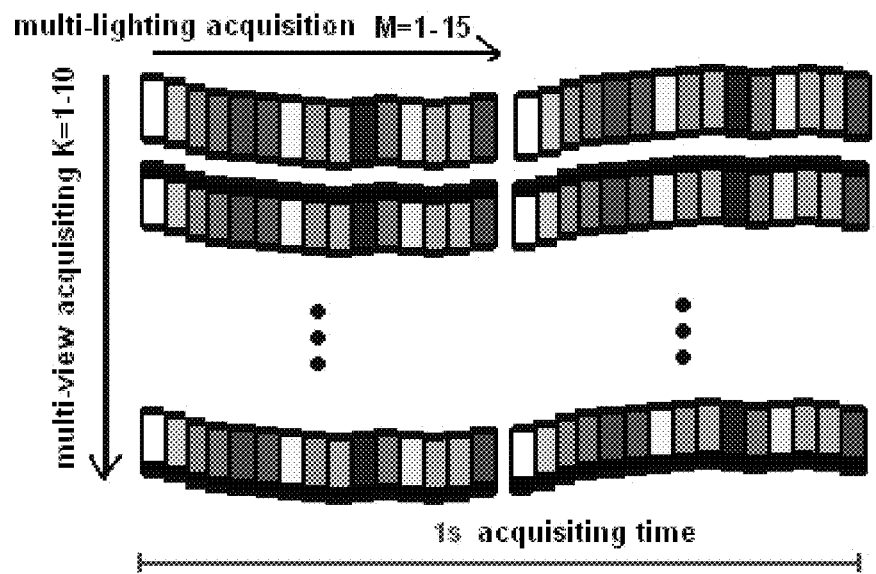
FIG. 4a is an illustration of the dynamic video before alignment.
Figure 4B:
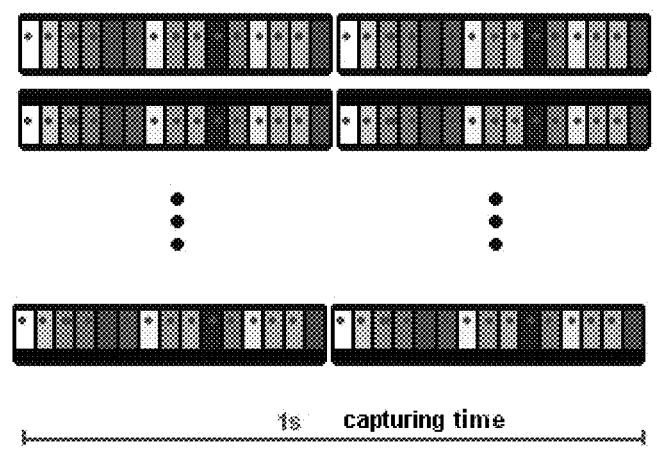
FIG. 4b is an illustration of the dynamic video after alignment.

According to an embodiment of the disclosure, the step 2.1 may further comprise a step 2.1.2 of interpolating the obtained two-dimensional trajectory and aligning each image frame of the captured video under varying (directional) illuminations with the image frame captured under the uniform lighting pattern, as shown in FIG. 4, where FIG. 4a is FIG. 4a is an illustration of the dynamic video before alignment, and FIG. 4b is an illustration of the dynamic video after alignment.

According to an embodiment of the disclosure, the step 2.1 may further comprise a step 2.1.3 of performing a confidence verification to pixels in the image frames captured under varying illuminations using Robust Principal Component Analysis method (RPCA). For textures commonly used, the lighting characteristics thereof are dominated by low-frequency components. Noises, blocking shadings, oversaturation at highlight areas etc., existing in the captured video may be considered as residual components, which are not in accordance with the low-frequency characteristics. Thus, according to an embodiment of the present disclosure, RPCA may be used for removing such outlier effects, and the remaining low frequency component may be used for later calculation. Those areas with rather small residual value may be deemed as an area satisfying a predetermined confidence threshold or an area with a high confidence. Therefore, according to an embodiment of the disclosure, the step of performing confidence verification may comprise a step of discarding the oversaturated pixels and the invisible pixels in the captured data at different times. By discarding the oversaturated pixels and/or the invisible pixels, accuracy of the photometric stereo recovered thereof may be ensured accordingly.

According to an embodiment of the disclosure, the step 2.1 of obtaining normal field and surface reflectance peculiarities may further comprise a step 2.1.4 of individually processing each pixel of the image frames which are obtained after confidence verification, and recovering the surface normal information and the surface reflectance peculiarities of the visible areas in each single view based on a polynomial texture model which will be described in detail in the following.

According to an embodiment of the disclosure, the step of individually processing each pixel in the image frames may comprise steps of: by selecting lighting patterns with a high confidence selected in the step 2.1.3 as a data set, firstly, considering a Lambertian lighting model $I^d = \rho^d(N*L)$, and recovering the normal information N and a diffuse albedo coefficient $\rho^d$ of surfaces in the visible areas of the object in the single view, where L may be obtained using the environment map $Map_L$ obtained in the step 1.3 and in particular $$L = \sum_p L_p,$$

and $L_p = Map_L(p)\mathrm{dir}(p)$, where Map may represent the environment map, p may represent a pixel in the environment map, and dir(p) may represent the lighting direction corresponding to pixel p. Then, the specularity may be considered as follows: $I^s = I - I^d$, where I may represent a pixel value in the captured image frame. Then, specularity $(\rho_1^s, \ldots, \rho_K^s)$ in the corresponding visible areas may be recovered based on a polynomial texture model. According to an embodiment of the present disclosure, the polynomial texture model may be $$I^s = \sum_p \|L_p\| \sum_{k=1}^K \rho_k^s (N * H_p)^k,$$

and $H_p = \frac{1}{2}(V_p)$ where $\rho_1^s$, $\rho_K^s$ may be specularity albedo coefficients corresponding to the first to $k^{th}$ order; I may represent a pixel value in the acquired image frame; K may represent an order of the polynomial texture model, for example K=5; L may represent an incident light direction; V may represent an viewing direction; and H may represent a halfway vector based on L and V respectively. It should be noted that other polynomial texture model(s) may also be used by a person skilled in the art under the condition that same or similar effects may be obtained accordingly. Then, reflectance peculiarities $\rho = (\rho^d, \rho_1^s, \ldots, \rho_K^s)$ of the visible areas may be obtained by combining the diffuse albedo coefficient $\rho^d$ and the specularity albedo coefficients $(\rho_1^s, \ldots, \rho_K^s)$. In addition, local smoothness in each sub-region of the visible areas may be added as constraints, to solve the undetermined optimization calculation. Therefore, by the polynomial texture model as described above for photometric stereo calculating, the dynamic scene relighting may be ensured with plausible rendering effects.

In the step 2.2, the surface normal and surface reflectance peculiarities of the visible areas in each single view of the object may be integrated to obtain the three-dimensional shape model and surface reflectance peculiarities thereof. In the present disclosure, a complete three-dimensional shape model and reflectance peculiarities may be generated by using an optical flow method in combination with the photometric stereo recovering results.

According to an embodiment of the disclosure, the step 2.2 may comprise a step 2.2.1 of matching the surface normal information $N^p$, $N^q$ and the surface reflectance peculiarities $\rho^p$, $\rho^q$ of the adjacent or adjoining views p and q using a matching error energy function as follows and removing erroneous matching points by epipolar constrain:

$$q = \min_q (\alpha_1 \|N^p - N^q\| + \alpha_2 |\rho^p - \rho^q| + \alpha_3 |SIFT(\rho^p) - SIFT(\rho^q)|),$$

s.t. $q = F \cdot p$ where $\alpha_{1,2,3}$ are power factors, the function SIFT(•) may be a calculating result of a SIFT (Scale-Invariant Feature Transform) feature descriptor, F may represent a fundamental matrix between the neighboring views, and s.t. (subject to) may represent epipolar constraining condition(s) or epipolar constrain.

According to an embodiment of the disclosure, the step 2.2 may further comprise a step 2.2.2 of integrating the surface normal information and the surface reflectance peculiarities in each single view of the object based on the matching results of the adjacent or adjoining views to calculate the three-dimensional shape model and the surface reflectance of each model vertex. According to an embodiment of the disclosure, the integrating thereof may comprise the following steps. Based on the matching in step 2.2.1, the calculating results of the same pixels in different single views are combined or corrected to be consistent with each other. For example, the median or average value based on different single views may be selected as the final integrating value, or the calculating result of the single view which may fit with the selected polynomial texture model having the minimum error may represent the integrating values or results.

According to an embodiment of the disclosure, the step 2.2 may further comprise a step 2.2.3 of filling the surface normal information and the surface reflectance peculiarities of holes and invisible areas existing on the surface of the object based on local smoothness constraints to obtain a complete and continuous three-dimensional shape model, the surface normal information and the surface reflectance peculiarities of each model vertex.

Figure 5:
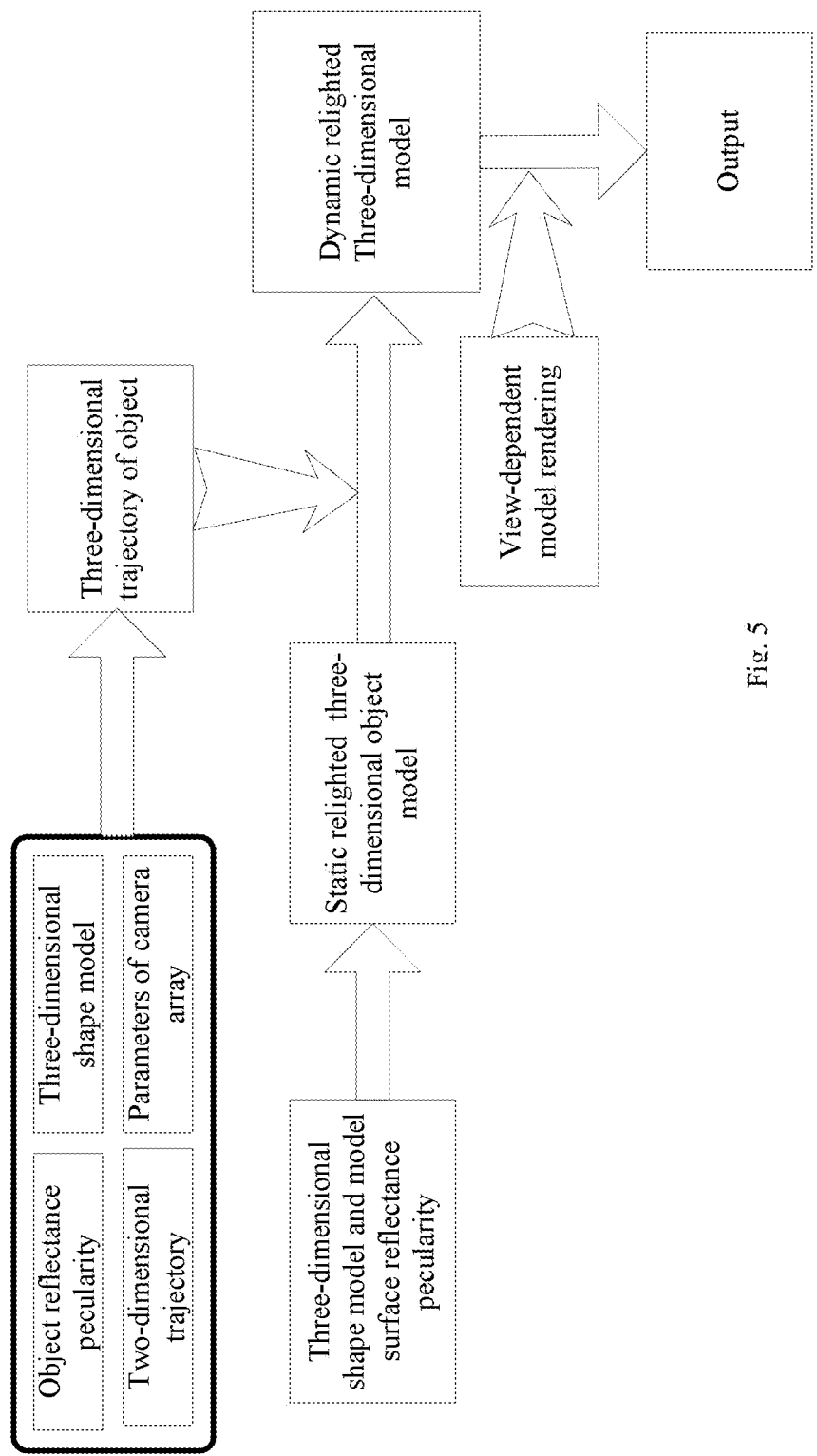
FIG. 5 is a block diagram of a method for free-view relighting of a dynamic scene based on photometric stereo according to an embodiment of the present disclosure.

In step 3) or S3, a static relighted three-dimensional model of the object and a three-dimensional trajectory of the object may be obtained based on the obtained three-dimensional shape model, the normal information and the surface reflectance peculiarities thereof respectively, as shown in FIG. 5. That is to say, based on the obtained three-dimensional shape model, the normal information and the reflectance peculiarities thereof, the object may be rendered under a user-defined ideal lighting to obtain the static relighted three-dimensional model.

According to an embodiment of the disclosure, the step S3 may further comprise a step 3.1 of performing a static relighting to the three-dimensional shape model of the object at the aligning time in step 2.1.2 based on the recovered normal information and reflectance peculiarities of the object using the polynomial texture model as described above to obtain the static relighted three-dimensional model.

Based on a Lambertian lighting model and a polynomial texture model as listed in the follows, the static relighted three-dimensional model may be obtained accordingly:

$$I' = I^{d'} + I^{s'}.$$

Lambertian Lighting Model:

$$I^{d'} = \rho^d (N * L')$$

where $$L' = \sum_p \mathrm{Map}_{L'}(p) \cdot dir(p),$$

p may be a pixel in the environment map; and
Polynomial Texture Model:

$$I^s = \sum_p \|L'_p\| \sum_{k=1}^{K} \rho_k^s (N * H_p)^k,$$

and, $$H'_p = \tfrac{1}{2}(V + L'_p).$$

In the step 4) or S4, the dynamic relighted three-dimensional model changing along the time may be obtained based on the static relighted three-dimensional model and the three-dimensional trajectory of the object may be estimated from the captured dynamic videos.

According to an embodiment of the disclosure, the step S4 may comprise a step 4.1 of obtaining the three-dimensional trajectory of each vertex of the three-dimensional shape model by minimizing differences between movement projection in each single view and the actually captured data, considering the three-dimensional shape model normal field and surface reflectance peculiarity of each vertex and the two-dimensional trajectory in each view. Parameters of the cameras at the corresponding view of the multi-view camera array, such as intrinsic matrix, normally represented by K, and an extrinsic matrix, normally represented by [R t], are employed during this step.

More specifically, in each single view, the differences between projection of the estimated 3D movement, and the optical flow estimated 2D trajectory are calculated by the following formula:

$$\min_{x'^2, y'^2, z'^2} \sum_{v \in V_S} \left\| P_v \cdot \begin{bmatrix} x'^2 - x'^1 \\ y'^2 - y'^1 \\ z'^2 - z'^1 \end{bmatrix} - m_v \left( P_v \cdot \begin{bmatrix} x'^1 \\ y'^1 \\ z'^1 \end{bmatrix} \right) \right\| + w\|\Delta(x'^2 - x'^1)\| + \quad (A)$$

$$w\|\Delta(y'^2 - y'^1)\| + w\|\Delta(z'^2 - z'^1)\| + |\rho(x'^2, y'^2, z'^2) - \rho(x'^1, y'^1, z'^1)|$$

where v may represent a certain view in a view range $V_s$ where points $(x^{t1}, y^{t1}, z^{t1})$ and $(x^{t2}, y^{t2}, z^{t2})$ are both visible, $P_v$ may represent a projection matrix corresponding to the view, $m_v$ may represent a two-dimensional trajectory corresponding to the view, $\Delta(\bullet)$ may represent a Laplacian operator, and w may represent a weighting factor which may be influenced by local normal consistencies at the beginning time and the finishing time of the trajectory of the point. According to an embodiment of the present disclosure, $$w=\|\Delta(N(x^{t2},y^{t2},z^{t2})-N(x^{t1},y^{t1},z^{t1}))\|.$$

That is to say, if a local normal consistency is changed during the movement of a pixel, non-rigid movement may occur inside the local area. Therefore, there should be no more smoothness requirements of the moving trajectory of each point inside these areas, thus w within these areas should be small.

It should be noted that the first item in the above equation constraints the consistency between the three-dimensional trajectory projection and the two-dimensional trajectory of each single view. The second to fourth items in the above equation (A) constraints the spatial smoothness of the three-dimensional trajectory of each model vertex. The fifth item constraints the reflectance peculiarity consistency of the corresponding point at two different times.

According to an embodiment of the disclosure, the step S4 may further comprise a step 4.2 of performing inpainting and filtering to the obtained three-dimensional trajectory, so that a complete and continuous trajectory of the three dimensional model of the object may be obtained accordingly.

According to the static three-dimensional object relighted model at the aligning time in the step 3.1 and the three-dimensional trajectory, the dynamic relighted three-dimensional model corresponding to each time in the dynamic video may be obtained accordingly.

More specifically, according to an embodiment of the disclosure, for each model vertex at the beginning time, color information of each vertex on the relighted model may remain constant based on the three-dimensional movement trajectory of the object, thus obtaining an relighted object model corresponding to each time, and the integrated information at each time may be deemed as a dynamic relighted three-dimensional model.

Lastly, in the step S5, a view dependent rendering to the dynamic relighted three-dimensional model of the object may be performed according to a predetermined free-view defined, for example, by a user, whereby a free-view relighting of the object is achieved accordingly. For this step, any view dependent rendering method commonly known in the art may be used instead.

FIG. 5 schematically shows the whole process for free-view relighting of a dynamic scene according to an embodiment of the disclosure. From the method as described above, the whole relighting of the dynamic scene may be simplified and performed rapidly.

Figure 6:
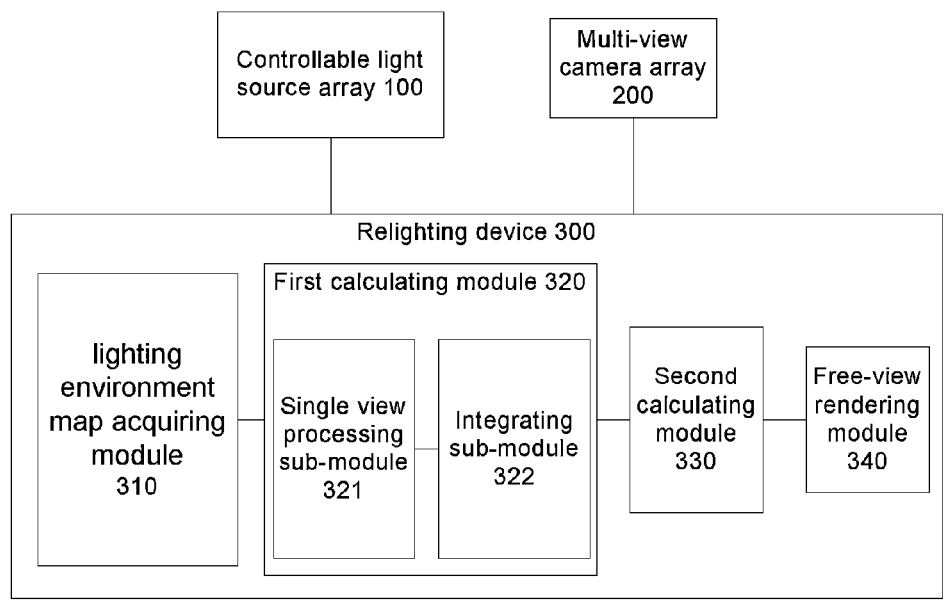
FIG. 6 is a schematic block diagram of a system for free-view relighting of a dynamic scene based on photometric stereo according to an embodiment of the disclosure.

Further, according to another aspect of the disclosure, a system for free-view relighting of a dynamic scene based on photometric stereo may be provided. FIG. 6 is a schematic block diagram of a system for free-view relighting of a dynamic scene based on photometric stereo according to an embodiment of the disclosure. The system may comprise a controllable light source array 100, a multi-view camera array 200 which may be synchronized with the controllable light source array 100, and a relighting device 300 connected with the multi-view camera array 200. The controllable light source array 100 may set a controllable lighting sequence to provide the desired predetermined controllable varying illuminations. The multi-view camera array 200 may be used for capturing dynamic videos of an object. The relighting device 300 may be used for obtaining a three-dimensional shape model and surface reflectance peculiarities of the three-dimensional shape model of the object based on the captured dynamic videos of the object using the multi-view camera array 200, obtaining a static relighted three-dimensional model based on the three-dimensional shape model and surface reflectance peculiarities of the object, obtaining a three-dimensional trajectory of the object based on the obtained three-dimensional shape model, the surface reflectance peculiarities thereof and the multi-view dynamic videos, obtaining a dynamic relighted three-dimensional model based on the static relighted three-dimensional model and the three-dimensional trajectory of the object, and performing a free-view dependent rendering on the dynamic relighted three-dimensional model of the object, whereby the free-view relighting of the object may be achieved accordingly.

According to an embodiment of the disclosure, the relighting device 300 may comprise an illumination environment map acquiring module 310 for forming a panorama by frames of a crystal ball based on multi-view videos captured on the crystal ball placed at a center of an acquisiting scene formed from the multi-view camera array 200 and the controllable light source array 100 by the multi-view camera array 200 using a complete combination of controllable lighting sequences to obtain the illumination environment map corresponding to each time.

According to an embodiment of the disclosure, the relighting device 300 may comprise a first calculating module 320, a second calculating module 330 and a free-view rendering module 340. The first calculating module 320 may be configured to obtain a three-dimensional shape model and surface reflectance peculiarities of the three-dimensional shape model of the object based on the captured dynamic videos of the object and obtain a static relighted three-dimensional model and a three-dimensional trajectory of the object based on the obtained three-dimensional shape model and surface reflectance peculiarities thereof. The second calculating module 330 may be configured to obtain a dynamic relighted three-dimensional model based on the static relighted three-dimensional model and the three-dimensional trajectory of the object obtained by the first calculating module 320. The free-view rendering module 340 may be configured to perform a free-view dependent rendering on the dynamic relighted three-dimensional model of the object obtained by the second calculating module 330 based on a predetermined free-view to realize a free-view relighting of the object.

According to an embodiment of the disclosure, more specifically, the first calculating module 320 may comprise a single-view processing sub-module 321 and an integrating sub-module 322. The single-view processing sub-module 321 may be configured to obtain the surface normal information and surface reflectance peculiarities of visible areas in each single view using the obtained dynamic videos from each single view. The integrating sub-module 322 may be configured to integrate the surface normal information and the surface reflectance peculiarities of the visible area in each single view of the object to obtain the three-dimensional shape model and the model surface reflectance peculiarities of the object.

According to an embodiment of the disclosure, the single-view sub-module 321 may be configured to align any two image frames captured under uniform lightings provided by the controllable light source array 200 in the obtained dynamic videos for each single view and estimate or obtain a two-dimensional trajectory of the object, interpolate the obtained two-dimensional trajectory of the object and align each image frame captured under varying illuminations provided by the controllable light source array 200 with the image frame captured under the uniform lightings, perform a confidence verification to pixels in the image frames captured under varying illuminations using Robust Principal Component Analysis method, and recover the surface normal information and surface reflectance peculiarities of the visible areas in each single view using the image frames acquired under the predetermined controllable varying illuminations after the confidence verification based on a polynomial texture model.

According to an embodiment of the disclosure, the single-view sub-module 321 may be configured to recover the surface normal information N and a diffuse albedo coefficient $\rho^d$ of surfaces in the visible areas of the each single view based on a Lambertian lighting model $I^d = \rho^d(N*L)$ where L is calculated based on the environment map, recover the specularity $(\rho_1^s, \ldots, \rho_K^s)$ of the corresponding visible areas based on peculiarity $I^s = I - I^d$ and the polynomial texture model, where I may represent a pixel value in the acquired image frames and $\rho_1^s, \rho_K^s$ may represent specularity albedo coefficients corresponding to the first to $k^{th}$ order; and obtain reflectance peculiarities $\rho = (\rho^d, \rho_1^s, \ldots, \rho_K^s)$ of the surfaces in the visible areas by combining the diffuse albedo coefficient $\rho^d$ and the specularity albedo coefficients $(\rho_1^s, \ldots, \rho_K^s)$. According to an embodiment of the disclosure, the polynomial texture model may be as follows:

$$I^s = \|L\| \sum_{k=1}^{K} \rho_k^s (N*H)^k,$$

and $$H = \tfrac{1}{2}(V+L),$$

where K may represent an order of the polynomial texture model;

L may represent an incident light direction;

V may represent an viewing direction; and

H may represent a halfway vector based on L and V respectively.

According to an embodiment of the disclosure, the integrating sub-module 322 may be configured to match the surface normal information and the surface reflectance peculiarities of the visible areas of the object in the adjacent views using a matching error energy function as follows and remove erroneous matching points by epipolar constrain:

$$q = \min_{q} (\alpha_1 \|N^p - N^q\| + \alpha_2 |\rho^p - \rho^q| + \alpha_3 |SIFT(\rho^p) - SIFT(\rho^q)|),$$

s.t. $q = F \cdot p$ where $\alpha_{1,2,3}$ are power factors, the function SIFT(•) may be a calculating result of a SIFT (Scale-Invariant Feature Transform) feature descriptor, F may represent a fundamental matrix between the neighboring views, and s.t. (subject to) may represent epipolar constraining condition(s) or epipolar constrain.

Further, the integrating sub-module 322 may be configured to integrate the surface normal information and the surface reflectance peculiarities in each single view of the object based on the matching results of the adjacent views to calculate the three-dimensional shape model and the surface reflectance peculiarities corresponding to each model vertex of the model.

According to an embodiment of the disclosure, the integrating sub-module 322 may fill the surface normal information and the surface reflectance peculiarities of holes existing on the surface of the object and the invisible areas based on smoothness constraints to obtain a complete and continuous three-dimensional shape model, the surface normal information and the surface reflectance peculiarities of each model vertex.

According to an embodiment of the disclosure, the second calculating module 330 may be further configured to obtain the three-dimensional trajectory of each model vertex of the three-dimensional shape model by the least square method based on the three-dimensional shape model and the surface reflectance peculiarity of each model vertex constrained by the two-dimensional trajectory in combination with parameters of the camera array 200, such as intrinsic matrix, normally represented by K, and an extrinsic matrix, normally represented by [R t].

According to an embodiment of the disclosure, the second calculating module 330 may be further configure to perform inpainting and filtering to the surface of the obtained three-dimensional shape model according to scene smoothness constraints to the three-dimensional trajectory of each point on the surface of the object.

With the system disclosed in the present disclosure, the free-view relighting of the dynamic object may be easily and rapidly implemented.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A method for free-view relighting of a dynamic scene based on photometric stereo, comprising the following steps of:
   (1) performing multi-view dynamic videos capturing of an object using a multi-view camera array under a predetermined controllable varying illumination, and setting a controllable lighting sequence by a controllable light source array comprising a plurality of LED light sources to provide the desired predetermined controllable varying illuminations,
   wherein step (1) further includes the steps of:
      placing a crystal ball at a center of the acquisiting scene surrounded by the multi-view camera array and the controllable light source array, and capturing the crystal ball by the multi-view camera array using the predetermined controllable lighting sequence provided by the controllable light source array; and
      forming a panorama of the dynamic scene based on frames of the crystal ball in the multi-view dynamic video to obtain an environment map corresponding to the time;
   (2) obtaining a three-dimensional shape model and surface reflectance peculiarities of the object based on the captured multi-view dynamic videos, and obtaining surface normal information and surface reflectance peculiarities of a visible area in each single view using the obtained dynamic videos of the object for each single view, wherein the step of obtaining the normal information and surface reflectance peculiarities further includes the steps of:

aligning any two image frames captured under uniform lighting of the controllable lighting sequence in the obtained dynamic videos for each single view and obtaining a two-dimensional trajectory of the object;

interpolating the obtained two-dimensional trajectory of the object and aligning each captured video under variable lighting of the controllable lighting sequence with the image frame captured under the uniform lighting;

performing a confidence verification to pixels in the image frames captured under the variable lighting and the uniform lighting using Robust Principal Component Analysis method; and recovering the surface normal information and the surface reflectance peculiarities in the visible areas of the object in the each single view using the image frames acquired under the predetermined controllable varying illumination after the confidence verification based on a polynomial texture model wherein the polynomial texture model is $$I^s = \|L\| \sum_{k=1}^{K} \rho_k^s (N * H)^k,$$

and $H = \frac{1}{2}(V+L),$ where K represents an order of the polynomial texture model;

L represents an incident light direction;

V represents a viewing direction; and

H represents a halfway vector based on L and V respectively;

and the step of recovering the surface normal information and the surface reflectance peculiarities further includes the following steps:

recovering the surface normal information N and a diffuse albedo coefficient $\rho^d$ in the visible areas of the object in the single view based on a Lambertian lighting model $I^d = \rho^d(N*L)$, where L is calculated based on the environment maps;

recovering the specularity $(\rho_1^s, \ldots, \rho_K^s)$ of the surfaces in the corresponding visible areas based on $I^s = I - I^d$ and the polynomial texture model, where $\rho_1^s, \rho_K^s$ are specularity albedo coefficients corresponding to the first to $k^{th}$ order, and I represents a pixel value in the captured image frame; and obtaining reflectance peculiarities $\rho = (\rho^d, \rho_1^s, \ldots, \rho_K^s)$ of the surfaces in the visible areas by combining the diffuse albedo coefficient $\rho^d$ and the specularity $(\rho_1^s, \ldots, \rho_K^s)$; and the step (2) further includes integrating the surface normal information and the surface reflectance peculiarities of the visible area in each view to obtain the three-dimensional shape model of the object and model surface reflectance peculiarities corresponding to the three-dimensional shape model, (3) obtaining a static relighted three-dimensional model of the object based on the obtained three-dimensional shape model and surface reflectance peculiarities thereof, and obtaining a three-dimensional trajectory of the object based on the three-dimensional shape model, the surface reflectance peculiarities and the multi-view dynamic videos;

(4) obtaining a dynamic relighted three-dimensional model based on the static relighted three-dimensional model and the three-dimensional trajectory of the object; and (5) performing a free-view dependent rendering to the dynamic relighted three-dimensional model of the object, whereby a free-view relighting of the object is achieved.

2. The method according to claim 1, wherein the step (1) further comprises steps of:

performing geometric and color calibration for the multi-view camera array; and performing synchronizing calibration between the multi-view camera array and the controllable light source array, so that the multi-view capturing is performed for the dynamic scene.

3. The method according to claim 1, wherein the step of integrating the surface normal information and the surface reflectance peculiarities of the visible area in each view to obtain a three-dimensional shape model of the object and model surface reflectance peculiarities corresponding thereto further comprises a step of:

adding local smoothness constraints to the surface normal information and the surface reflectance peculiarities of the object in each sub-divided area of the visible areas which are divided into a plurality of sub-divided areas.

4. The method according to claim 3, wherein the step of integrating the surface normal information and the surface reflectance peculiarities of the visible area in each view to obtain a three-dimensional shape model of the object and model surface reflectance peculiarities corresponding thereto further comprises the following steps of:

matching the surface normal information and the surface reflectance peculiarities of the visible areas in the object in adjacent views using a matching error energy function and removing erroneous matching points by epipolar constrain; and integrating the surface normal information and the surface reflectance peculiarities of the visible areas in each single view of the object based on the matching results of the adjacent views to calculate the three-dimensional shape model of the object and the surface reflectance peculiarities corresponding to each model vertex of the model.

5. The method according to claim 4, wherein the step of integrating the surface normal information and the surface reflectance peculiarities of the visible area in each view to obtain a three-dimensional shape model of the object and model surface reflectance peculiarities corresponding thereto further comprises the following step of:

filling the surface normal information and the surface reflectance peculiarities of holes existing on the surface of the object and the invisible areas based on smoothness constraints to obtain the three-dimensional shape model with complete and continuous surface normal information and the surface reflectance peculiarities.

6. The method according to claim 1, wherein the step (3) further comprises steps of:

obtaining the three-dimensional trajectory of each model vertex of the three-dimensional shape model by the least square method based on the three-dimensional shape model; and obtaining the surface reflectance peculiarity of each model vertex constrained by the two-dimensional trajectory in combination with parameters of the camera array.

7. The method according to claim 6, wherein the step of obtaining the three-dimensional trajectory of each model vertex of the three-dimensional shape model further comprises a step of:

performing inpainting and filtering to the surface of the obtained three-dimensional shape model according to scene smoothness constraints to the three-dimensional trajectory of each model vertex of the object.

8. A system for free-view relighting of a dynamic scene based on photometric stereo, comprising:

a controllable light source array for generating predetermined controllable varying illuminations;

a multi-view camera array for capturing dynamic videos of an object under the predetermined controllable varying illuminations, wherein the camera array is synchronized with the controllable light source array setting a controllable lighting sequence, to provide the desired predetermined controllable varying illumination; and a relighting device for obtaining a three-dimensional shape model and surface reflectance peculiarities of the three-dimensional shape model of the object based on the captured dynamic videos of the object, obtaining a static relighted three-dimensional model based on the three-dimensional shape model and surface reflectance peculiarities of the object, obtaining a three-dimensional trajectory of the object based on the obtained three-dimensional shape model, surface reflectance peculiarities thereof and the multi-view dynamic videos, obtaining a dynamic relighted three-dimensional model based on the static relighted three-dimensional model and the three-dimensional trajectory of the object, and performing a free-view dependent rendering on the dynamic relighted three-dimensional model of the object, whereby the free-view relighting of the object is achieved;

wherein the relighting device comprises:

an environment map acquiring module for forming a panorama by frames of a crystal ball based on multi-view videos captured on the crystal ball placed at a center of an acquisiting scene surrounded by the multi-view camera array and the controllable light source array using the controllable lighting sequence to obtain the environment map which is time dependent;

a first calculating module for obtaining a three-dimensional shape model and surface reflectance peculiarities of the three-dimensional shape model of the object based on the captured dynamic videos of the object by the multi-view camera array, obtaining static relighted three-dimensional model based on the three-dimensional shape model and surface reflectance peculiarities of the object and obtaining a three-dimensional trajectory of the object based on the obtained three-dimensional shape model, surface reflectance peculiarities thereof and the multi-view dynamic videos, wherein the first calculating module comprises a single-view processing sub-module for obtaining surface normal information and surface reflectance peculiarities of a visible area in each single view using the obtained dynamic videos for each single view; and an integrating sub-module for integrating the surface normal information and surface reflectance peculiarities of the visible area in each single view of the object to obtain the three-dimensional shape model and the model surface reflectance peculiarities of the object;

wherein the single-view sub module is configured to align any two image frames captured under uniform lightings of the controllable lighting sequence in the obtained dynamic videos for each single view and obtain a two-dimensional trajectory of the object;

interpolate the obtained two-dimensional trajectory of the object and align each image frame captured under variable lighting of the controllable lighting sequence with the image frame captured under the uniform lighting;

perform a confidence verification to pixels in the image frames captured under the varying illuminations using Robust Principal Component Analysis method;

recover the surface normal information and the surface reflectance peculiarities in the visible areas of the object in the each single view using the image frames acquired under the predetermined controllable varying illumination after the confidence verification based on a polynomial texture model;

recover the surface normal information N and a diffuse albedo coefficient $\rho^d$ in the visible areas of the single view based on a Lambertian lighting model $I^d = \rho^d (N*L)$, where L is calculated based on the environment map;

recover the specularity $(\rho_1^s, \ldots, \rho_K^s)$ of the surfaces in the corresponding visible areas based on a $I^s = I - I^d$ and the polynomial texture model, where $\rho_1^s, \rho_K^s$ are specularity coefficients corresponding to the first to $k^{th}$ order, and I represents a pixel value in the captured image frame; and obtain reflectance specularity $\rho = (\rho^d, \rho_1^s, \ldots, \rho_K^s)$ of the surfaces in the visible areas by combining the diffuse albedo coefficient $\rho^d$ and the specularity $(\rho_1^s, \ldots, P_K^s)$;

wherein the polynomial texture model is as follows:

$$I^s = \|L\| \sum_{k=1}^{K} \rho_k^s (N*H)^k,$$

and $$H = \frac{1}{2}(V+L),$$

where K represents an order of the polynomial texture model;

L represents an incident light direction;

V represents a viewing direction; and

H represents a halfway vector based on the L and V respectively;

a second calculating module for obtaining a dynamic relighted three-dimensional model based on the static relighted three-dimensional model and the three-dimensional trajectory of the object from the first calculating module; and a free-view rendering module for performing the free-view dependent rendering on the dynamic relighted three-dimensional model of the object from the second calculating module based on a predetermined free-view to realize the free-view relighting of the object.

9. The system according to claim 8, wherein the integrating sub-module is configured to
match the surface normal information and the surface reflectance peculiarities of the visible area of the object in adjacent views using a matching error energy function and remove erroneous matching points by epipolar constrain; and
integrate the surface normal information and the surface reflectance peculiarities of the visible area of the object in each single view of the object based on the matching results of the adjacent views to calculate the three-dimensional shape model of the object and the surface reflectance peculiarities corresponding to each model vertex of the model.

10. The system according to claim 9, wherein the integrating sub-module is further configured to fill the surface normal information and the surface reflectance peculiarities of holes existing on the surface of the object and the invisible areas based on smoothness constraints to obtain the three-dimensional shape model with complete and continuous surface normal information and the surface reflectance peculiarities.

11. The system according to claim 8, wherein the second calculating module is configured to
obtain the three-dimensional trajectory of each model vertex of the three-dimensional shape model by the least square method based on the three-dimensional shape model and the surface reflectance peculiarity of each point on the surface constrained by the two-dimensional trajectory in combination with parameters of the camera array; and
perform inpainting and filtering to the surface of the obtained three-dimensional shape model according to scene smoothness constraints to the three-dimensional trajectory of each model vertex of the object.

* * * * *